United States Patent [19]
Mizuno et al.

[11] Patent Number: 5,774,355
[45] Date of Patent: Jun. 30, 1998

[54] EQUIPMENT CONTROL SYSTEM AND METHOD

[75] Inventors: Yoshihiro Mizuno, Tokyo; Ryohei Inaba, Kawasaki; Hideki Yamaguchi, Tokyo, all of Japan

[73] Assignee: Canon Kabushiki Kaisha, Tokyo, Japan

[21] Appl. No.: 762,527

[22] Filed: Dec. 9, 1996

Related U.S. Application Data

[63] Continuation of Ser. No. 360,456, Dec. 21, 1994, abandoned.

[30] Foreign Application Priority Data

Dec. 27, 1993 [JP] Japan .................................. 5-348568

[51] Int. Cl.$^6$ ...................................................... G06F 19/00
[52] U.S. Cl. ......................... 364/140; 364/131; 395/821
[58] Field of Search .................................. 364/140, 141, 364/146, 147, 131–134, 136, DIG. 2; 395/856, 852, 892, 893, 821

[56] References Cited

U.S. PATENT DOCUMENTS

| | | |
|---|---|---|
| 4,298,958 | 11/1981 | Takaki et al. ....................... 364/DIG. 2 |
| 4,683,549 | 7/1987 | Takaki ................................. 364/147 X |
| 4,876,664 | 10/1989 | Bittorf et al. ........................... 364/131 |
| 5,177,420 | 1/1993 | Wade et al. ......................... 364/147 X |
| 5,197,129 | 3/1993 | Kayama et al. ....................... 395/868 |
| 5,212,631 | 5/1993 | Schmidt et al. ....................... 364/136 |
| 5,225,974 | 7/1993 | Mathews et al. ...................... 364/140 |

*Primary Examiner*—Joseph Ruggiero
*Attorney, Agent, or Firm*—Robin, Blecker, Daley and Driscoll

[57] ABSTRACT

In a programmable controller system, a sequence program, an operation sequence control program module and a plurality of I/O control program modules including interlock control are independently provided. In the interlock control of the start condition and the operation end condition of an actuator, an interlock condition set program is separated from the operation sequence control program, and the interlock condition is described in a table, thereby easily setting the interlock condition in the form of a table. As described above, when the operation sequence control program executed by a programmable controller and the input/output control program including the interlock control are independently provided, the number of steps in programming can be decreased, and reliability and maintenance performance of the program can be improved.

25 Claims, 7 Drawing Sheets

FIG. 3A

START CONDITION TABLE

| | SENSOR 4a | SENSOR 4b | SENSOR 4c | SENSOR 4d | SENSOR 4e | SENSOR 4f | I/O CONTROL UNIT 2a END SIGNAL | I/O CONTROL UNIT 2b END SIGNAL | I/O CONTROL UNIT 2c END SIGNAL |
|---|---|---|---|---|---|---|---|---|---|
| ACTUATOR 5a | OFF | ON | ON | OFF | OFF | OFF | | N | N |
| ACTUATOR 5b | OFF | ON | OFF | ON | OFF | OFF | | ON | N |

FIG. 3B

END CONDITION TABLE

| | SENSOR 4a | SENSOR 4b | SENSOR 4c | SENSOR 4d | SENSOR 4e | SENSOR 4f | I/O CONTROL UNIT 2a END SIGNAL | I/O CONTROL UNIT 2b END SIGNAL | I/O CONTROL UNIT 2c END SIGNAL |
|---|---|---|---|---|---|---|---|---|---|
| ACTUATOR 5a | ON | OFF | OFF | OFF | OFF | OFF | | N | N |
| ACTUATOR 5b | OFF | OFF | ON | OFF | OFF | OFF | | N | N |

EQUIPMENT CONTROL SYSTEM AND METHOD

This is a continuation application under 37 CFR 1.62 of prior application Ser. No. 08/360,456, filed Dec. 21, 1994 abandoned.

BACKGROUND OF THE INVENTION

The present invention relates to an equipment control system and method for performing operation sequence control, interlock control, and input/output control.

In a general programmable controller system, a single programmable controller performs both operation sequence control and I/O (input/output) control including control of the start and operation end condition signals (interlock signal) for an actuator. FIG. 5 is a block diagram schematically showing the first arrangement of a general programmable controller system. This programmable controller system (to be referred to as a first programmable controller system hereinafter) has a programmable controller 41, an I/O terminal board 42, input devices (e.g., sensors) 44a to 44f arranged in the system, output devices (e.g., actuators, drivers for driving a motor, or solenoid valves for driving a cylinder) 45a to 45f arranged in the system, and connection cables 43a to 43l for connecting the I/O terminal 42, the input devices, and the actuators in the system. In an actual electrical connection of the input devices 44a to 44f or the output devices 45a to 45f, these devices are individually directly connected to the I/O terminal 42 of the programmable controller 41 by the connection cables 43a to 43l.

In recent years, a programmable controller system has been put into practical use, in which a serial communication means of the RS scheme or the like is used as a means for simplifying the wiring operation. In this method, the programmable controller is connected to an I/O relay device by a single cable, and a plurality of I/O devices are connected to the I/O relay device. FIG. 6 is a block diagram schematically showing the second arrangement of the general programmable controller system. In this programmable controller system, the programmable controller is connected to the I/O relay device by a single cable, thereby effectively decreasing the number of steps in the wiring operation and improving the reliability of the wiring operation. However, its control program needs to have the same structure as that of the first programmable controller system.

The programmable controller system according to the second arrangement (to be referred to as a second programmable controller system hereinafter) has a programmable controller 21, a plurality of I/O relay units 22a to 22c, and serial communication units 33a to 33c of the RS scheme or the like for connecting the programmable controller 21 and the plurality of I/O relay units 22a to 22c. The programmable controller 21 includes an operation control unit 30, an I/O control unit 34 integrally constituted with the operation control unit 30, and a serial communication unit 31 added as a separate unit. The serial communication unit 31 has a connector (not shown) connected to a serial communication cable 23. The I/O relay units 22a to 22c respectively have the serial communication units 33a to 33c, I/O relay units 32a to 32c, and power supply units (not shown). The serial communication units 33a to 33c have connectors (not shown) connected to the serial communication cable 23. The I/O relay units 32a to 32c have I/O connectors (not shown) connected to sensors 24a to 24f and actuators 25a to 25f.

The operation of the above-described second programmable controller will be described below.

FIG. 7 is a flow chart showing only an actuator operation routine for operating the actuator 25a in a control program executed by the second programmable controller. Before starting of the actuator 25a, the programmable controller 21 confirms the state of the operating condition (interlock) for the actuator 25a (step S301). In step S301, the logic state of a coil or the like in the programmable controller, which represents the start condition for the actuator 25a, is confirmed. The states of the sensors in the system are confirmed to determine whether the actuator 25a can be safely operated. The programmable controller 21 communicates with the I/O relay units 22a to 22c through the serial communication means 31 and performs a polling operation through a signal route a, thereby confirming the states of the sensors 24a to 24f in the system.

The programmable controller system confirms the interlock state. If the operating condition is satisfied, the flow advances to the next step to output a command for operating the actuator 25a (step S304). Upon reception of this operation command, the actuator 25a is started.

Subsequently, the programmable controller 21 confirms the state of the operation end condition (interlock) for the actuator 25a (step S306). In step S306, the programmable controller 21 confirms the states of the sensors in the system to determine whether a defined operation of the actuator 25a has ended. By the same method as in the above-described step S301, the programmable controller 21 confirms the states of the sensors in the system. If the operation end condition is satisfied, the programmable controller 21 outputs a logic signal representing the end of the operation of the actuator 25a to the internal coil or the like, thereby ending this routine.

In the second programmable controller system, the programmable controller 21 performs remote control of the input/output (I/O) operation through the serial communication means 31. Except for the serial communication control, the control contents are the same as those of the first programmable controller system shown in FIG. 5, in which the sensors 44a to 44f and the actuators 45a to 45f are directly connected to the I/O terminal 42 of the programmable controller 41 without using the I/O relay units.

As described above, in the first and second programmable controller systems, all programs for operation sequence control, interlock control, and I/O control must be individually described in a single programmable controller in accordance with the operation needs of a to-be-controlled unit, so that much time is required for programming. Particularly, the interlock control program cannot be omitted for the sake of a stable operation of the apparatus and accounts for a large program amount. Additionally, for the same reason as described above, much time is also required for the program operation confirming operation and the debugging operation. Additionally, the programmable controller has a large number of I/O terminals and a large amount of programs, resulting in difficulty in maintenance of the apparatus or decoding of the programs upon system change.

As for the electrical connection between the programmable controller and the input/output devices, the devices must be individually connected to the terminal board of the programmable controller. For this reason, the number of steps in the wiring operation is increased in manufacturing and installing the system. In addition, troubles due to a wiring error tend to occur at the time of set-up of the system.

The programmable controller system having I/O relay units using serial communication means of the RS scheme or the like provides a great effect of decreasing labors in the wiring operation. However, since this communication is of the "1:N" type, the I/O relay units cannot be made intelligent. For example, the ON/OFF state of a sensor cannot be transmitted to the remaining I/O relay units without passing through the programmable controller.

SUMMARY OF THE INVENTION

It is an object of the present invention to provide an equipment control method and system which allow separation of a first control apparatus for commanding the operation sequence of a to-be-controlled equipment and a second control apparatus for driving the equipment on the basis of the command for the operation sequence and the state of the to-be-controlled equipment.

It is another object of the present invention to separate the first and second control apparatuses from each other, thereby decreasing the number of functions assigned to each control apparatus and the capacity of a control program.

It is still another object of the present invention to provide an equipment control method and apparatus which allow the second control apparatus to confirm an interlock condition in driving the to-be-controlled equipment.

It is still another object of the present invention to provide an improved user interface capable of registering the interlock condition in the second control apparatus in the form of a table.

It is still another object of the present invention to, in an equipment control method and system having a plurality of second control apparatuses, share a signal input from the to-be-controlled equipment between the second control apparatuses.

The present invention also has as its object to provide a programmable controller system capable of improving the reliability and maintenance performance of a program and realizing reliable wiring in two-way communication.

In order to achieve the above object, according to an arrangement of a programmable controller system of the present invention, there is provided a programmable controller system having a plurality of control units, wherein an operation sequence control program module and an input/output control program module including interlock control are provided to constitute a sequence program, and the control units for executing the operation sequence control program module and executing the input/output control program module are independently provided, the control units performing communication to process the sequence program.

According to the programmable controller system, the plurality of control units perform communication to process the sequence program during execution of the operation sequence control program module and the input/output control program module including the interlock control, which are independently arranged.

Another arrangement of the programmable controller system of the present invention comprises a plurality of control units to which operation sequence control means and input/output control means for processing a sequence program are respectively assigned, and communication means for performing two-way communication among the plurality of control units.

According to the programmable controller system, the plurality of control units to which the operation sequence control means and the input/output control means are respectively assigned perform two-way communication by the communication means, thereby processing the sequence program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A and 3B are explanatory views showing an interlock table 15a in detail;

DETAILED DESCRIPTION OF THE PREFERRED EMBODIMENTS

Preferred embodiments of the present invention will now be described in detail in accordance with the accompanying drawings.

A programmable controller system according to an embodiment of the present invention will be described below with reference to the accompanying drawings.

Figure 1:
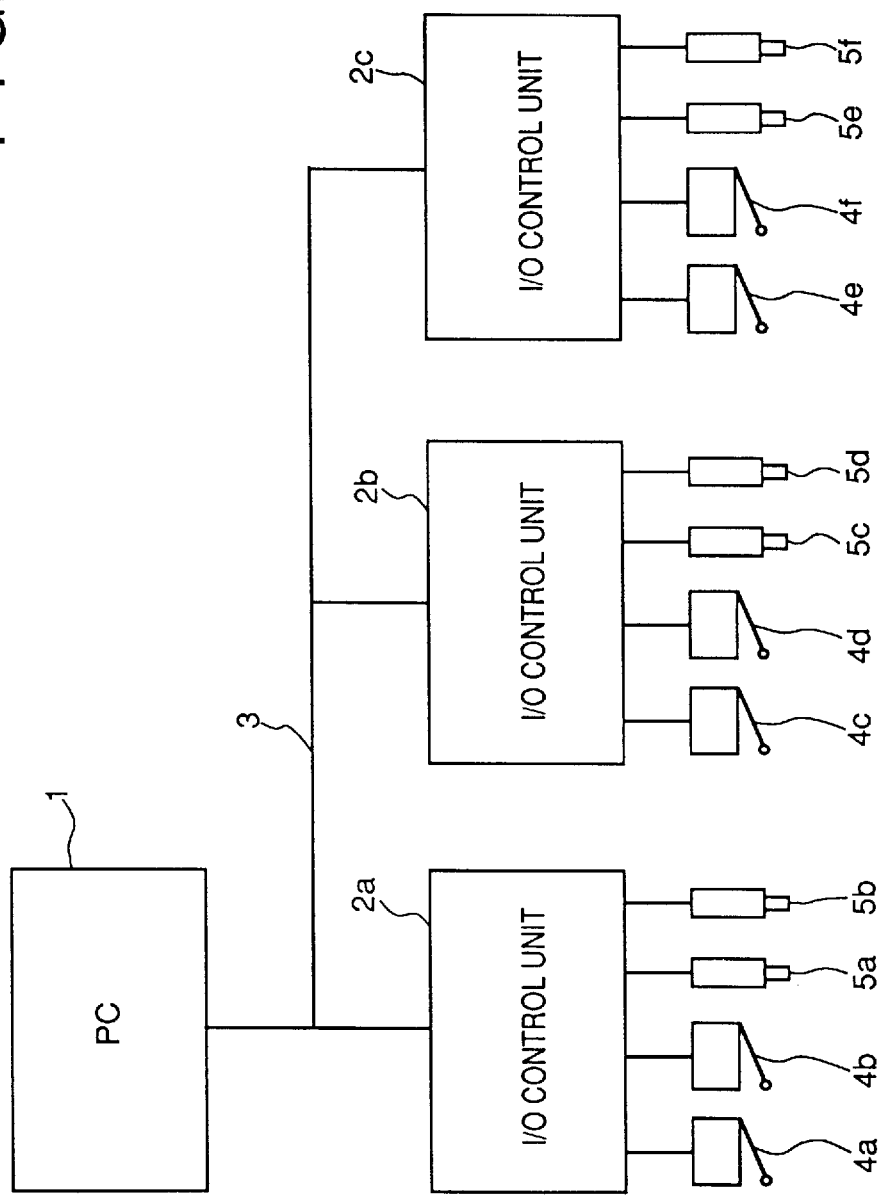
FIG. 1 is a block diagram showing the entire arrangement of a programmable controller system according to an embodiment.

FIG. 1 is a block diagram showing the entire arrangement of the programmable controller system of this embodiment. The programmable controller system of this embodiment has a programmable controller (PC) 1, a plurality of I/O control units 2a to 2c, and a LAN cable 3 for connecting the programmable controller 1 and a LAN (Local Area Network) constituted by the plurality of I/O control units 2a to 2c.

A plurality of sensors 4a to 4f serving as input devices and a plurality of actuators 5a to 5f serving as output devices are connected to the I/O control units 2a to 2c. The sensors 4a and 4b are connected to the I/O control unit 2a, the sensors 4c and 4d are connected to the I/O control unit 2b, and the sensors 4e and 4f are connected to the I/O control unit 2c. The actuators 5a and 5b are connected to the I/O control unit 2a, the actuators 5c and 5d are connected to the I/O control unit 2b, and the actuators 5e and 5f are connected to the I/O control unit 2c.

Figure 2:
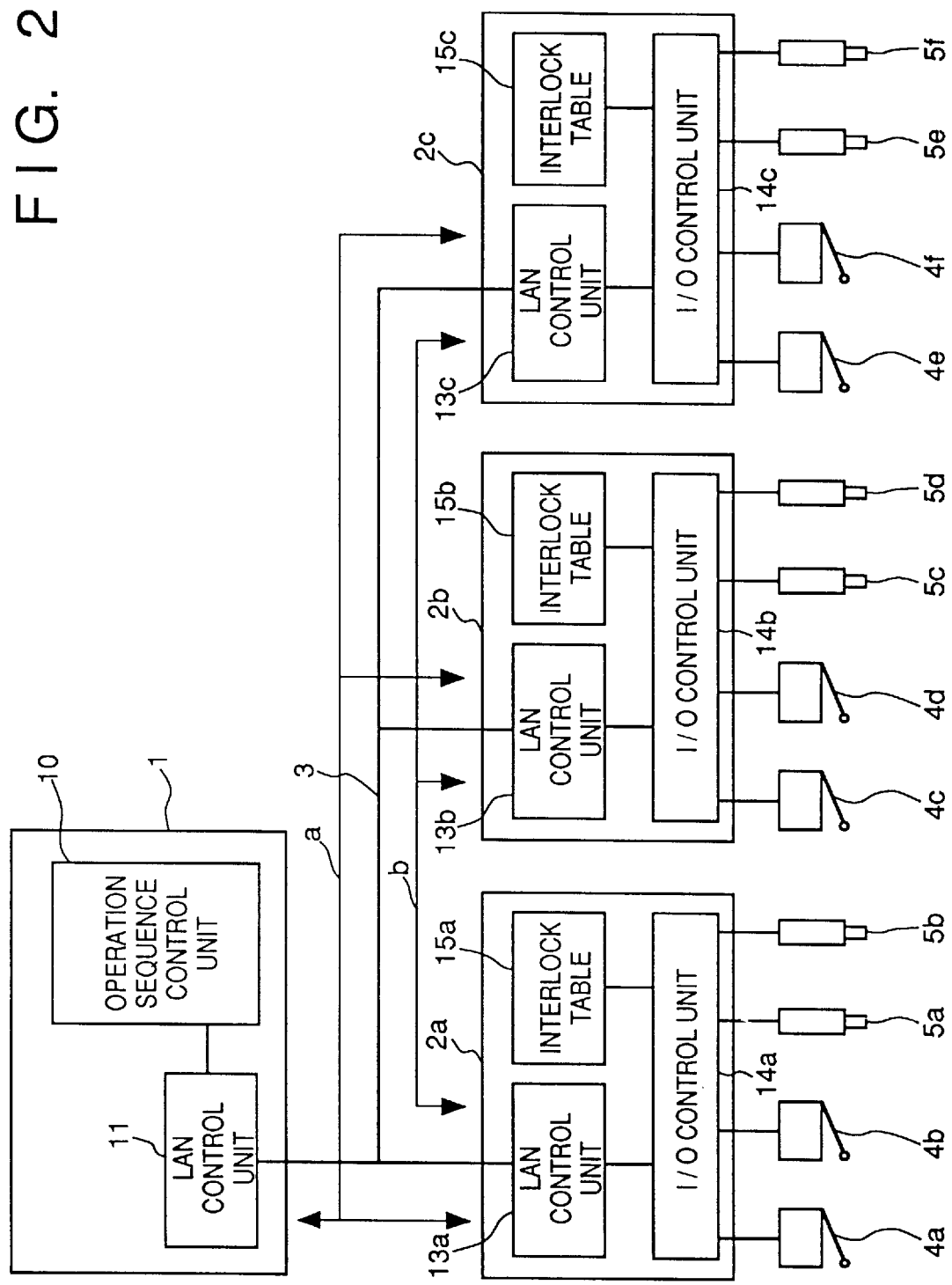
FIG. 2 is a block diagram showing the arrangement of the programmable controller system in more detail.

Each function in the above arrangement will be described in detail. FIG. 2 is a block diagram showing the arrangement of the programmable controller system of this embodiment in more detail. The programmable controller 1 has an operation sequence control unit 10 and a LAN control unit 11, both of which are connected by predetermined circuits. The LAN control unit 11 has a connector (not shown) connected to the LAN cable 3.

The I/O control units 2a to 2c respectively have LAN control units 13a to 13c, I/O control units 14a to 14c, interlock tables 15a to 15c, and power supply units (not shown) all of which are connected by predetermined circuits. The I/O control units 14a to 14c have I/O connectors (not shown) through which the sensors 4a to 4f and the actuators 5a to 5f are connected to the I/O control units 14a to 14c. The LAN control unit 11 has a connector (not shown) connected to the LAN cable 3.

FIGS. 3A and 3B are explanatory views showing the interlock table 15a in detail. In the interlock tables 15a to 15c, the start and end conditions for the actuators 5a to 5f (e.g., the actuators 5a and 5b in the interlock table 15a of the I/O control unit 2a) to be controlled by the corresponding I/O control units 2a to 2c are defined. The start and end conditions are defined in accordance with the states of all the sensors 4a to 4f used in the system for the actuators 5a to 5f, and the states of end signals output from the I/O control units 2a to 2c as needed.

The interlock table 15a can be prepared in the form of a table upon definition of each condition by a program designer. The interlock table 15a is constituted by a start condition table 16 (FIG. 3A) and an end condition table 17 (FIG. 3B), The actuators (5a and 5b) to be controlled by the I/O control unit 2a are named in a leftmost column 18. The states of all the sensors (4a to 4f) used in the system and the states of end signals output from the I/O control units 2a to 2c, as needed, are assigned to an uppermost row 19. Assume that the actuator 5a has a start condition that it can be started when the sensors 4b and 4c are in an ON state and the remaining signals are in an OFF state. In this case, as shown in a row 51a, ON (51a-3 and 51a-2) and OFF (51a-1 and 51a-4 to 51a-6) are respectively described in corresponding columns, thereby defining the condition. When the states of the sensors and the signals are to be ignored, i.e., when the sensors and signals can be set in either an ON or OFF state, this condition can be defined as N. For example, when the states of end signals from the I/O control units (2b and 2c) except for the corresponding I/O control unit 2a in the row 51a are to be ignored, N is described in the corresponding columns (51a-7 and 51a-8).

With the above-described programming interface, the interlock tables 15a to 15c are defined. These interlock condition data is referred by programs executed by the I/O control units 14a to 14c.

Figure 4:
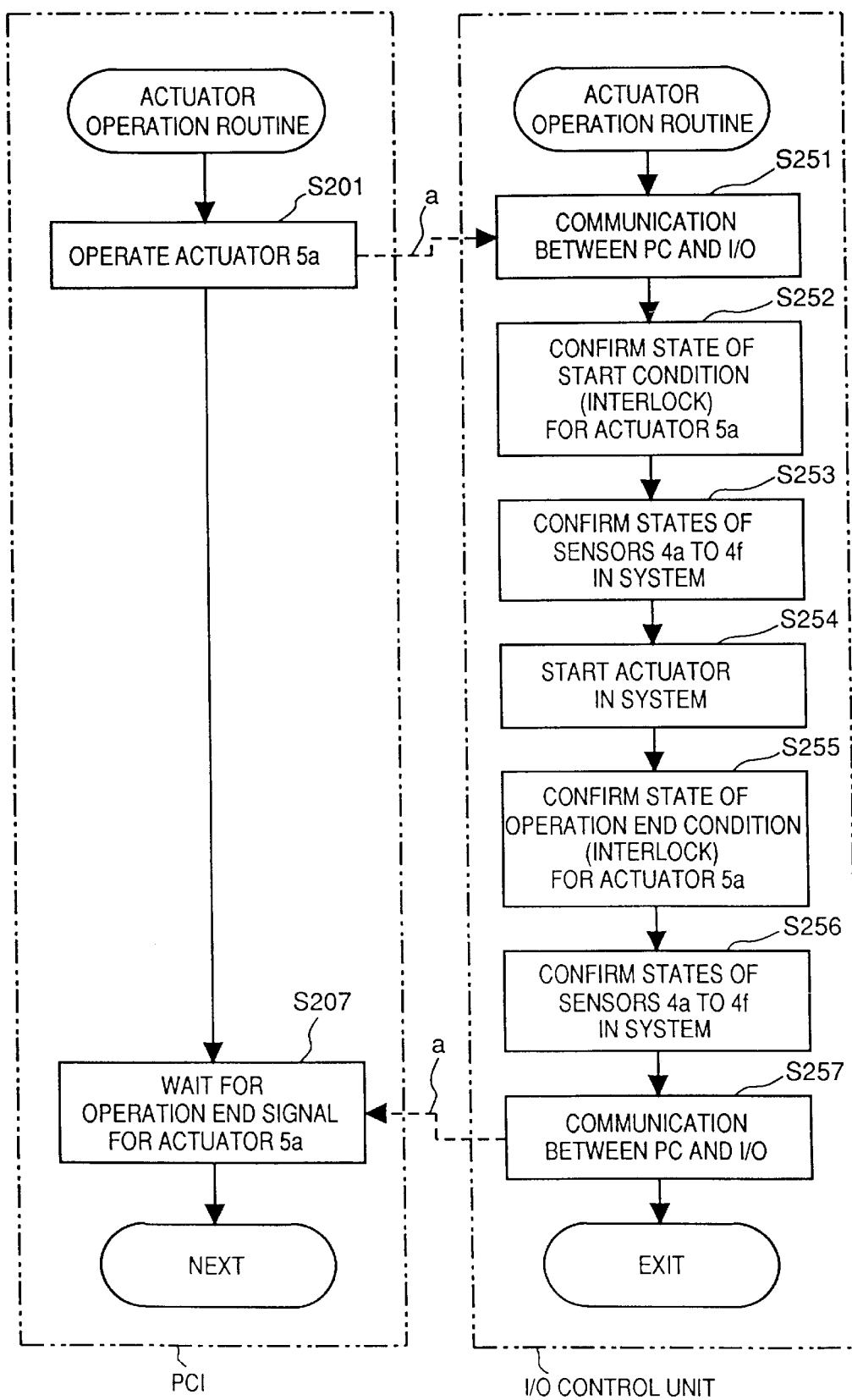
FIG. 4 is a flow chart showing a control program executed by the programmable controller system.
Figure 5:
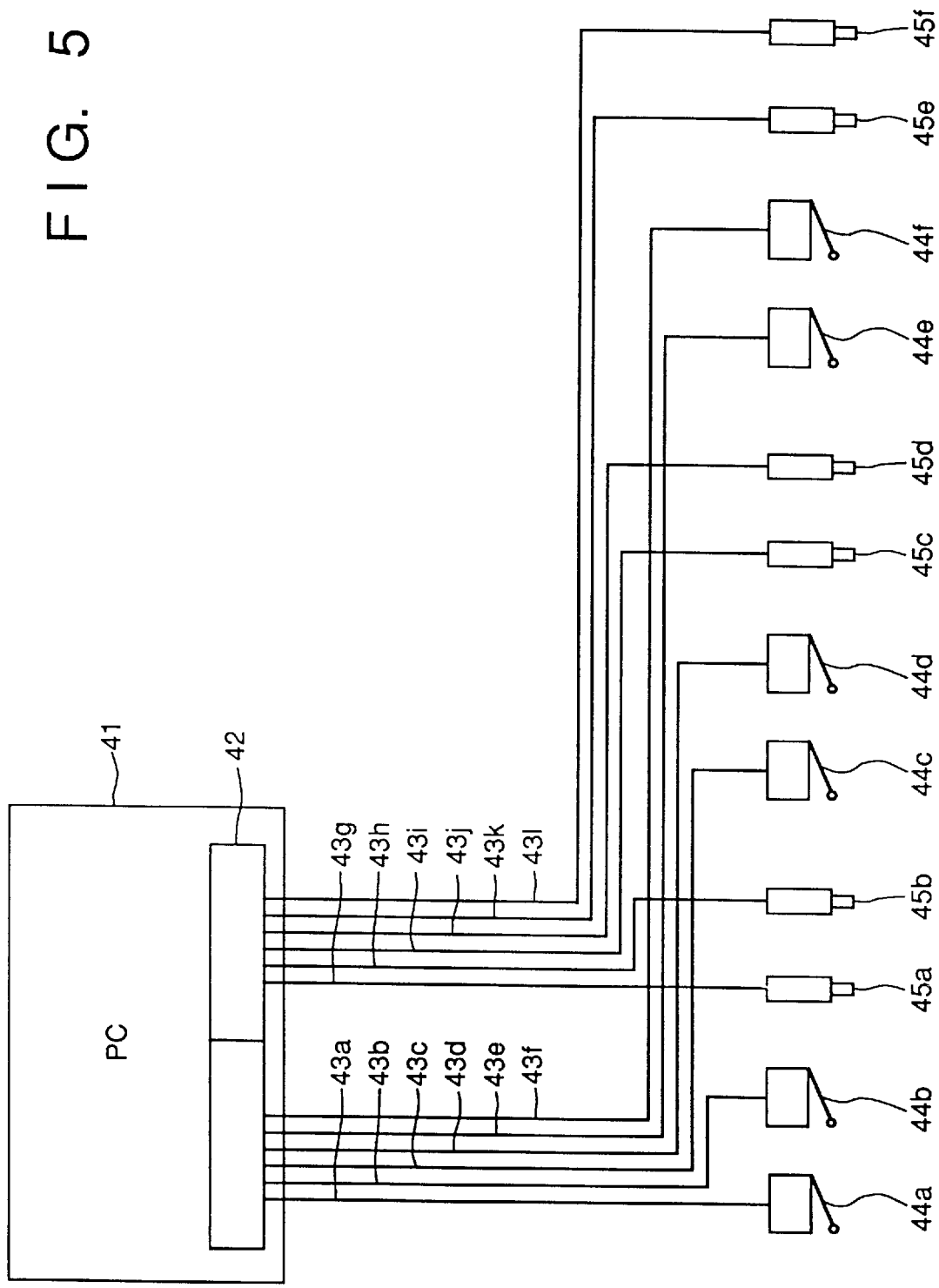
FIG. 5 is a block diagram schematically showing the entire arrangement of a general programmable controller system.
Figure 6:
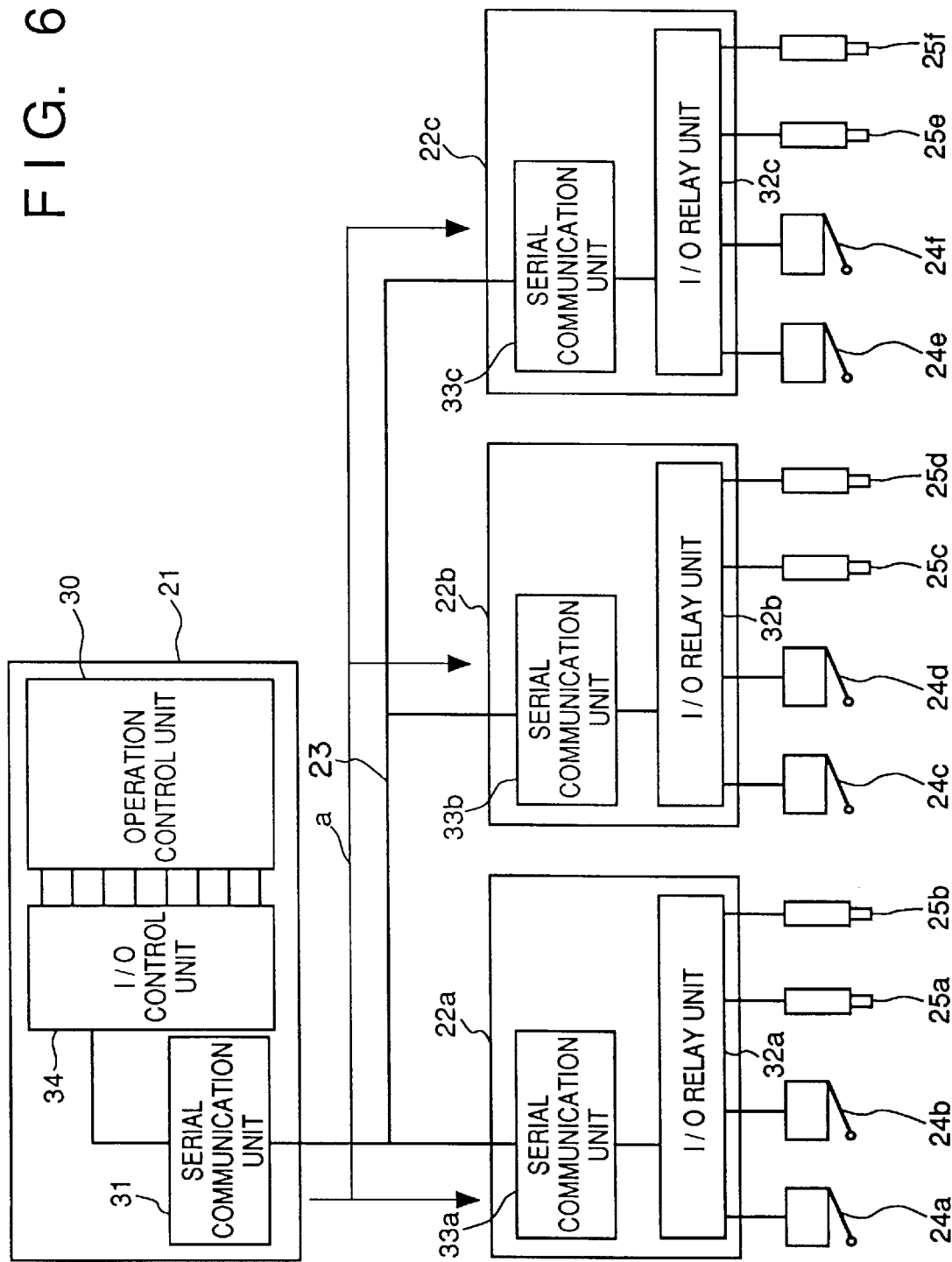
FIG. 6 is a block diagram schematically showing the entire arrangement of another example of the general programmable controller system.
Figure 7:
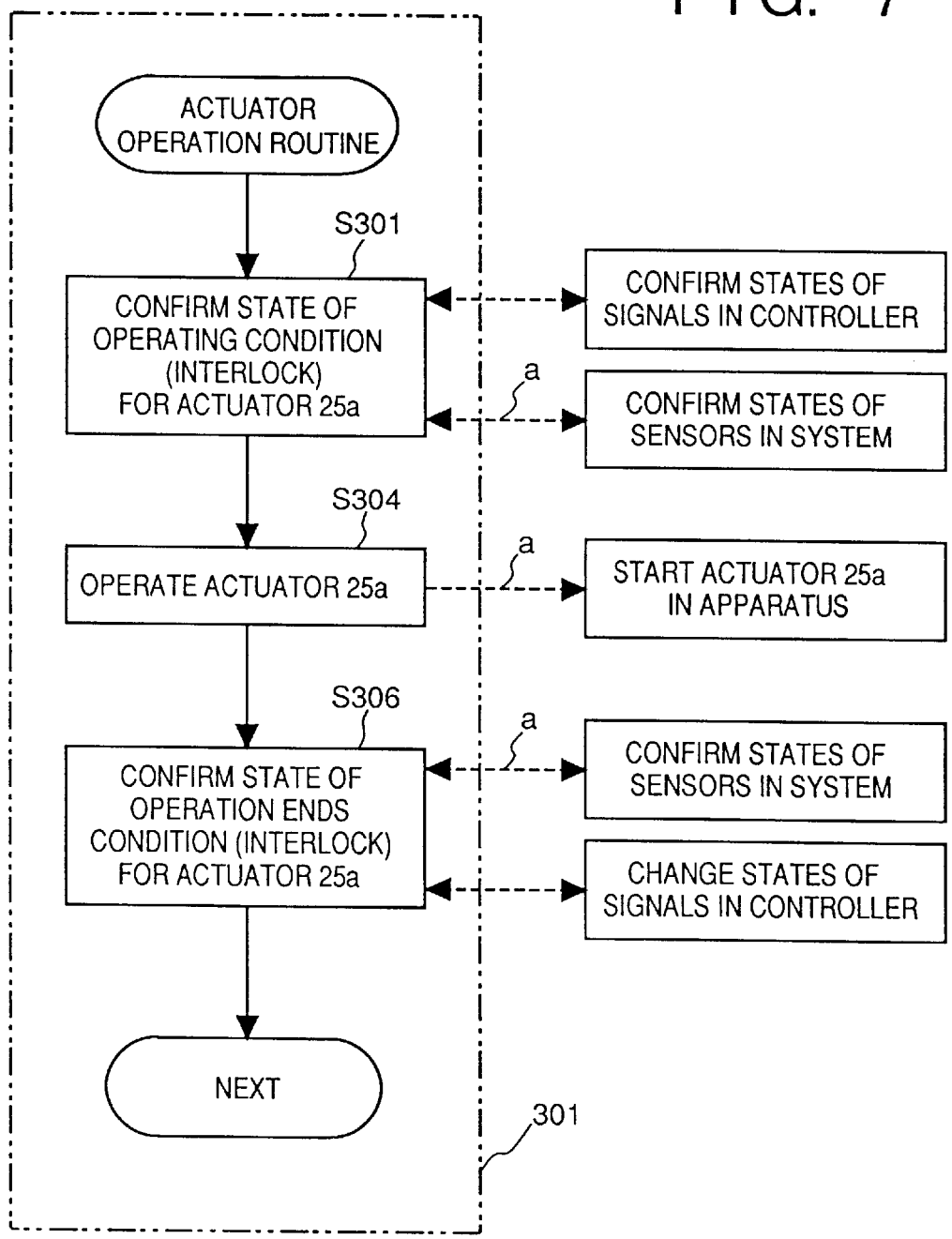
FIG. 7 is a flow chart showing only an actuator operation routine for operating an actuator 25a in a control program executed by a programmable controller in FIG. 6.

The control of the programmable controller system of this embodiment will be described below. FIG. 4 is a flow chart showing part of a control program executed by the programmable controller system of this embodiment. FIG. 4 shows only the control program for operating the actuator 5a. This control program is constituted by the program of an actuator operation routine executed by the programmable controller 1 and the program of an actuator operation routine executed by the I/O control unit 2a. Procedures for operating the actuator 5a will be described below.

The programmable controller 1 outputs a command for operating the actuator 5a to the I/O control unit 2a through the LAN cable 3 via a communication route a (step S201).

Upon reception of the command for operating the actuator 5a (step S251), the I/O control unit 2a confirms the interlock state of the actuator 5a in starting (step S252). In confirmation of the interlock state in starting, the I/O control unit 2a refers to the interlock table 15a in the apparatus to read the interlock condition for starting. The I/O control unit 2a confirms the states of the sensors 4a to 4f and the states of end signals from the remaining I/O control units 2b and 2c, as needed (step S253). In step S253, the I/O control unit 2a communicates with the remaining control units 2b and 2c through the LAN control units 13b and 13c and the I/O control units 14b and 14c in the remaining I/O control units 2b and 2c by using the LAN control unit 13a and the LAN cable 3, as indicated by a signal route b. With this communication, the states of the sensors 4c to 4f connected to the remaining I/O control units 2b and 2c and, if necessary, the states of the end signals from the remaining I/O control units 2b and 2c are checked.

If it is confirmed that the interlock condition for starting is satisfied, the I/O control unit 2a outputs an operation command to the actuator 5a, thereby starting the actuator 5a (step S254). In this example, the actuator 5a is started upon confirming that the sensors 4b and 4c are in an ON state, and the sensors 4a, 4d, 4e, and 4f are in an OFF state.

The I/O control unit 2a confirms the state of the operation end condition (interlock) for the actuator 5a (step S255). In confirmation of the interlock state in ending, the I/O control unit 2a refers to the interlock table 15a to read the interlock condition for ending. The I/O control unit 2a confirms the state of the sensors 4a to 4f and, if necessary, the states of end signals from the remaining I/O control units 2b and 2c (step S256).

In step S256, the I/O control unit 2a communicates with the remaining I/O control units 2b and 2c through the LAN control units 13b and 13c and the I/O control units 14b and 14c in the remaining I/O control units 2b and 2c via the LAN control unit 13a and the LAN cable 3 along the signal route b as in starting. The I/O control unit 2a checks the states of the sensors 4c to 4f connected to the remaining I/O control units 2b and 2c and, if necessary, the states of the end signals from the remaining I/O control units 2b and 2c. If it is confirmed that the interlock condition for ending is satisfied, the I/O control unit 2a informs the programmable controller 1 of the ending of operation of the actuator 5a by using the LAN control unit 13a and the LAN cable 3 through the communication route a (step S257). Upon reception of the operation end signal for the actuator 5a from the I/O control unit 2a, the programmable controller 1 confirms the ending of the operation, and the flow advances to the next processing (step S207).

As described above, in the programmable controller system of this embodiment, the programmable controller 1 mainly performs the operation sequence control for operating the actuator 5a. For this reason, as compared to the programmable controller in a conventional system, which basically performs three control processes such as operation sequence control, interlock control, and I/O control, the amount of programs in the programmable controller 1 is very small, and at the same time, only a smaller number of functions are required in the programmable controller 1. The reason for this is as follows. In the programmable controller system of this embodiment, the LAN control units 13a to 13c for performing two-way communication among the I/O control units 2a to 2c are respectively provided to the I/O control units 2a to 2c. Hence, the programmable controller 1 need not be involved at all in the procedures for detecting the states of the sensors 4a to 4f and the actuators 5a to 5f, all of which are separately arranged in the programmable controller system. In addition, the I/O control units 2a to 2c separately arranged near the sensors 4a to 4f and the actuators 5a to 5f perform interlock control and I/O control. For this reason, the program necessary for the operation of the entire programmable controller 1 plays the same role as that of the conventional system, as a matter of course.

The programmable controller system of this embodiment has a plurality of intelligent I/O control units 2a to 2c (having the program interpreter function and the two-way communication function) (the number of I/O control units is appropriately determined in accordance with the number and arrangement of sensors/actuators in the system). For this reason, the control unit resources and the programs are separately arranged in the system. In addition, in this embodiment, the programmable controller and the I/O control units are constituted by control units with different functions. However, by using a conventional general-purpose programmable controller (programmable controller having an operation sequence control means, an interlock control means, and an I/O control means), the control units (the PCI and the I/O control units 2a to 2c) in FIG. 1 may be constituted as units of the same type and realized in combination with a LAN control means such as a LAN interface module. In this case, the program in the general-purpose programmable controller assigned as the programmable controller 1 mainly defines the operation sequence. The program in the general-purpose programmable controller assigned as the I/O control units 2a to 2c executes the interlock control and the I/O control.

Although the interlock table of this embodiment sets one drive condition for each actuator, the present invention is not limited to this. For example, a plurality of types of interlock conditions may be described (in this case, the interlock conditions are described in a plurality of rows of the interlock table). If any one of these conditions is satisfied (i.e., these conditions are ORed), the actuator may be driven.

In addition, a case can be assumed in which a certain actuator is driven twice in one sequence, and the interlock condition of the first operation is different from that of the second operation. In this case, the interlock conditions can be described in two rows, and at the same time, a signal representing "first drive" or "second drive" can be received from the programmable controller 1, thereby selecting one of the interlock conditions. In this case, when the "first drive" and "second drive" signals from the programmable controller 1 are added to the condition items of the interlock table in FIG. 3A and/or 3B, the same description as that for the other sensor signal input is enabled. In this manner, a to-be-used interlock condition can be designated from the programmable controller 1.

As has been described above, according to the programmable controller of this embodiment, an operation sequence control program module and an input/output control program module including an interlock control program can be separately developed, so that program design is facilitated. The respective program modules can be simultaneously developed, and the load of the development can be appropriately divided. The operation sequence control program module for controlling the operation of an equipment and the input/output control program module for controlling the interlock or I/O signals are designed for different purposes. For this reason, when these program modules are separated from each others speed-up of the development can be achieved, and a logic error or careless error in signal reference can be prevented. The debugging performance of the program (easiness of the program operation confirming operation) and maintenance performance (easiness of maintenance of the apparatus or decoding of the program upon system change) are also improved. Additionally, by dividing the programs, the setting program for the interlock condition in the interlock control can be described using a table in the above-described form of a table. For this reason, the amount of labor required in programming or debugging of the interlock control which requires a particularly large amount of programs can be largely decreased.

In addition, when the programmable controller and the I/O control units are connected by a communication cable, the number of steps in wiring can be largely reduced and the reliability of wiring can be improved as compared to a conventional scheme in which the I/O terminal board of the programmable controller is connected to the sensors and the actuators in the system.

Furthermore, since communication among the control units is enabled by the two-way communication means, the amount of labor required in wiring, programming, and debugging is effectively decreased. Improvement in reliability of wiring and programming, improvement in maintenance performance, and facilitation of system change are also achieved.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A device control system having a first unit and a plurality of second units, said first and second units being individually provided, comprising:

first control means for outputting an operation signal based on an operation sequence of to-be-controlled equipment in said first unit;

first communication means for transmitting the operation signal to said plurality of second units;

second communication means for informing conditions of said equipment mutually among said plurality of second units to obtain condition information including conditions of a device detected by other second units; and second control means for performing drive control of said equipment on the basis of the operation signal input by said first communication means and said condition information.

2. The system according to claim 1, wherein said second control means confirms an interlock condition in accordance with said condition information.

3. The system according to claim 2, wherein the interlock condition is described in a table in which a drive target and the conditions to be confirmed are in correspondence with each other.

4. The system according to claim 1, wherein said first and second communication means are constituted by a local area network (LAN).

5. A device control method in which a device is controlled by a programmable control system having a first unit and a plurality of second units, said first unit and said plurality of second units being individually provided, comprising:

the first control step of outputting an operation signal based on an operation sequence of a to-be-controlled device in said first control unit;

the first communication step of transmitting the operation signal from said first control unit to the plurality of second control units;

the second communication step of informing conditions of said device mutually among said plurality of second units to obtain condition information including conditions of equipment detected by other second units; and the second control step of performing drive control of said equipment on the basis of the operation signal input through the first communication step and the condition information.

6. The method according to claim 5, wherein the second control step includes confirming an interlock condition in accordance with the condition information.

7. The method according to claim 6, wherein the interlock condition is described in a table in which a drive target and the conditions to be confirmed are in correspondence with each other.

8. The method according to claim 5, wherein the first and second communication steps are constituted by a local area network (LAN).

9. A control apparatus constituting a device control system, comprising:

receiving means for receiving a drive command from an external control apparatus;

communication means for communicating with another external control apparatus to share input signals from a to-be-controlled device; and control means for operating said device connected to said control apparatus on the basis of the drive command received by said receiving means, the input signal from said device connected to said control apparatus, and the input signals obtained by said communication means.

10. The apparatus according to claim 9, wherein said control means confirms an interlock condition in accordance with the input signals obtained from said device connected to said apparatus and the input signals obtained through said communication means.

11. The apparatus according to claim 10, wherein the interlock condition in said control means is described in a table in which a drive target and the input signals to be confirmed are in correspondence with each other.

12. The apparatus according to claim 9, wherein said receiving means and said communication means are constituted by a local area network interface.

13. A programmable controller system, comprising:

a first unit which instructs operation of devices; and a plurality of second units which detects conditions of devices and operates the devices, said first unit and said plurality of second units being individually provided, said first unit comprising:

output means for outputting a control signal for operating a to-be-controlled device in accordance with a sequence program which defines operation sequence of the devices, and each of said plurality of second units comprising:

obtaining means for obtaining conditions of the devices from other second units to obtain condition information including conditions detected by other second units; and control means for controlling the to-be-controlled device based on said condition information and the control signal outputted by said output means.

14. A programmable controller system according to claim 13, wherein said control means comprises:

judging means for judging whether or not the control signal can be performed based on said condition information; and operating means for operating the to-be-controlled device in accordance with the judging result of said judging means.

15. A programmable controller system according to claim 13, wherein each of said second units further comprising completion signal output means for outputting a completion signal to said first unit, which indicates that operation of the to-be-controlled device based on the control signal is completed.

16. A programmable controller system according to claim 14, wherein each of said units includes an interlock table in which interlock conditions are registered for each device connected to the second unit, and said judging means judges whether or not the control signal can be performed based on the condition information and the interlock conditions.

17. A programmable controller system according to claim 13, further comprising first communication means for transmitting the control signal between said first unit and said plurality of second units, and second communication means for transmitting the detected conditions among said plurality of second units.

18. A programmable controller system according to claim 17, wherein said second communication means utilizes portions of said first communication means.

19. A programmable controller system according to claim 17, wherein said first and second communication means utilize a local area network (LAN).

20. A process control system having a first unit and a plurality of second units, said first and second units being individually provided, comprising:

first control means for outputting an operation signal based on an operation sequence in said first unit;

first communication means for transmitting the operation signal to said plurality of second units;

second communication means for informing condition information including condition data obtained by other second units mutually among said plurality of second units; and second control means for performing process control on the basis of the operation signal input by said first communication means and said condition information.

21. The system according to claim 20, wherein the condition data is described in a table.

22. The system according to claim 20, wherein said first and second communication means are constituted by a network.

23. A process control system having a first unit and a plurality of second units, said first and second units being individually provided, comprising:

a first controller for outputting an operation signal based on an operation sequence in said first unit;

a first communication assembly for transmitting the operation signal to said plurality of second units;

a second communication assembly for informing condition information including condition data obtained by other second units mutually among said plurality of second units; and a second controller for performing process control on the basis of the operation signal input by said first communication means and said condition information.

24. The system according to claim 23, wherein the condition data is described in a table.

25. The system according to claim 23, wherein said first and second communication assemblies are constituted by a network.

* * * * *

UNITED STATES PATENT AND TRADEMARK OFFICE
CERTIFICATE OF CORRECTION

PATENT NO. : 5,774,355
DATED : June 30, 1998
INVENTOR(S) : Yoshihiro Mizuno

It is certified that error appears in the above-identified patent and that said Letters Patent is hereby corrected as shown below:

Col. 2, line 14, delete "a" and insert -- $\underline{a}$ --.

Col. 6, line 6, delete "b" and insert -- $\underline{b}$ --.

Col. 6, line 29, delete "b" and insert -- $\underline{b}$ --.

Signed and Sealed this

Twenty-ninth Day of December, 1998

Attest:

BRUCE LEHMAN

*Attesting Officer*  *Commissioner of Patents and Trademarks*